(12) United States Patent
Pettypiece, Jr. et al.

(10) Patent No.: US 6,838,870 B2
(45) Date of Patent: Jan. 4, 2005

(54) AIRBAG DEPLOYMENT MONITOR AND SENSING ELECTRONICS

(75) Inventors: Robert P. Pettypiece, Jr., Lakeland, FL (US); Tex K. Monroe, Deltona, FL (US); Timothy Ilyes, Lakeland, FL (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/845,328

(22) Filed: May 14, 2004

(65) Prior Publication Data

US 2004/0207388 A1 Oct. 21, 2004

Related U.S. Application Data

(62) Division of application No. 10/382,538, filed on Mar. 7, 2003.

(51) Int. Cl.[7] .............................. G01P 3/48; G01P 3/36
(52) U.S. Cl. ........................ 324/166; 324/173; 280/735
(58) Field of Search ........................ 324/166, 173–176; 280/735, 743, 743.2, 733, 739, 742

(56) References Cited

U.S. PATENT DOCUMENTS

| 3,739,276 | A | | 6/1973 | Dornberger |
| 3,780,297 | A | | 12/1973 | Geary |
| 4,074,128 | A | | 2/1978 | Harris, Jr. et al. |
| 4,995,639 | A | * | 2/1991 | Breed .......................... 280/735 |
| 5,166,626 | A | | 11/1992 | Hester et al. |
| 5,317,931 | A | | 6/1994 | Kalami |
| 5,957,490 | A | * | 9/1999 | Sinnhuber ................... 280/735 |
| 6,129,379 | A | | 10/2000 | Specht |
| 6,517,105 | B1 | | 2/2003 | Ford |
| 6,626,456 | B2 | | 9/2003 | Terbu et al. |
| 6,793,243 | B2 | * | 9/2004 | Husby ........................ 280/735 |

FOREIGN PATENT DOCUMENTS

EP        0 990 567 A1      4/2000

* cited by examiner

*Primary Examiner*—Jay Patidar
*Assistant Examiner*—Reena Aurora
(74) *Attorney, Agent, or Firm*—Lonnie Drayer; Patrick Steinnon

(57) ABSTRACT

An airbag deployment sensor has a cartridge containing a quantity of tape one end of which is attached to the inside surface of an airbag cushion. Deployment of the cushion pulls tape from the cartridge at a rate that is monitored by transmitting light through the tape, or by detecting the presence of metalized, or magnetic shielding portions, of the tape.

3 Claims, 5 Drawing Sheets

AIRBAG DEPLOYMENT MONITOR AND SENSING ELECTRONICS

This is a Divisional of application Ser. No. 10/382,538 filed Mar. 7, 2003.

FIELD OF THE INVENTION

The present invention relates to monitoring of airbag deployment with a tape, and methods and circuits for processing a stream of data received from a sensor that monitors the rate at which the tape is being withdrawn from a cartridge.

BACKGROUND OF THE INVENTION

Experience has shown that airbags work best in combination with seat belts and other safety systems. Although airbags contribute to the overall safety of occupants of an automobile, they can present a danger to a vehicle occupant who is positioned too close to an airbag when it deploys. This condition, where the vehicle occupant is positioned so that airbag deployment might be dangerous, is referred to as the vehicle occupant being "out of position." Various systems have been developed to detect an "out of position" vehicle occupant. Sensor systems designed to detect the vehicle occupant's position often require constant monitoring so that in the event of a crash the vehicle occupant's position is known. Sensor systems designed to detect the position of the vehicle occupant have been proposed based on ultrasound, optical, or capacitance sensors.

Constant monitoring of sensors, which may have high data rates, requires the design of algorithms which can reduce sensor data to a single condition or a limited number of data conditions which are used in an airbag, deployment decision to prevent airbag deployment or for a duel stage airbag to select the level of deployment. Maintaining data integrity between the non-crash positional data, and positional data needed during airbag deployment is complicated by the noisy environment produced by a crash. Dealing with data integrity issues requires increased processor capabilities and algorithm development, which also requires additional testing.

Prior art approaches attempt to determine, based on various sensors, the distance between the airbag and the passenger before the airbag is deployed. In many instances, the vehicle occupant will not be too close to the airbag at the time the decision to deploy the airbag is made, but, because of the rate at which the vehicle occupant is approaching the airbag, the vehicle occupant will be too close when the airbag is actually deploying. To handle these situations, more sophisticated sensors and algorithms are needed in order to attempt to predict the vehicle occupant's position when the airbag is actually deployed or nearly completely deployed. In other words, the ideal airbag deployment system functions such that the airbag deploys fully or nearly fully before the vehicle occupant engages the airbag. Existing systems inhibit airbag deployment when, based on various sensors and algorithms, it is determined that, because of the position of the vehicle occupant, the bag is more likely to harm than to benefit the vehicle occupant.

Successfully creating a sensor and algorithm system is complicated because there is usually very little delay between the decision to deploy and actual deployment. This is so because the maximum benefit from an airbag is achieved by early deployment, and at the same time, more time before deployment maximizes the information available to determine whether deployment is necessary. The desire to maximize effective deployment of the airbag while minimizing unnecessary deployment creates a tension between waiting for more information and deploying immediately. Therefore, once sufficient information is available, deployment typically follows nearly immediately.

A system which employs vehicle occupant position sensors and algorithms must be able to supply at all times an indication of whether airbag deployment should be inhibited so that the inhibit decision can be applied whenever the airbag deployment decision occurs. This means the sensors and algorithms used to develop the vehicle occupant position inhibit signal, cannot be optimized to deal with a specific time frame in which the actual deployment decision is made. The end result is that such algorithms may be less accurate than desired because they must predict events relatively far in the future—perhaps tens of milliseconds.

One known type of sensor shown in EP 0990567A1, employs a plurality of tapes which extend between the front of the airbag and a tape dispensing cartridge mounted on the airbag housing. Tape extraction sensors within the cartridge monitor the rate at which tape is withdrawn from the cartridge and thus can detect airbag impact with a vehicle occupant by a decrease in airbag velocity. This type of sensor which can monitor the way an airbag is actually deploying solves the problem of predicting whether a vehicle occupant will be out of position at time of airbag deployment. In this arrangement the airbag is deployed, and if it encounters a vehicle occupant before it has reached a certain stage of deployment the airbag is vented which effectively removes the airbag. Several tapes and tape dispensing cartridges are used to monitor different portions of the bag so that if any portion of the bag contacts a vehicle occupant, the fact of contact can be detected and the bag vented to prevent injury to the out-of-position occupant. To be practical, this type of sensor—which monitors actual deployment—needs simple but robust techniques for monitoring the rate at which tape is withdrawn from the cartridge.

SUMMARY OF THE INVENTION

The airbag deployment sensor of this invention has a cartridge in which a quantity of tape is stored. One end of the tape is attached to the inside surface of an airbag cushion so that when the cushion is deployed it pulls tape from the cartridge. The rate at which the tape is pulled from the cartridge is monitored by transmitting light through the tape, or by detecting the presence of the metalized or ferrous portions of the tape.

In a first embodiment a tape ½ mm by 5 mm constructed of black polyethylene has 2 mm diameter holes spaced 5 mm on center extending along the length of the tape. An infrared light emitting diode is positioned on one side of the tape and a phototransistor is positioned opposite the light emitting diode. The phototransistor is connected to a comparator circuit with hysteresis that provides a clean digital output proportional to the rate at which the holes formed in the tape are pulled past the phototransistor. Alternatively, an infrared transparent tape on which an infrared opaque pattern has been printed may be used.

In a second embodiment, a tape ½ mm by 5 mm has 5 mm regions that are spaced 5 mm apart, which have been metalized. For example, a metal film may be deposited on Mylar® tape and selectively etched to form metalized regions or metalized paint may be used on film or cloth. The metalized regions may be detected by one of three methods. The first method employs two closely spaced contacts that are connected by the metalized regions as they pass over the contacts. This type of detector may also be connected to a comparator circuit with hysteresis to provide a digital outlet. The second method for detecting the passage of the metalized regions employs a capacitive plate as a sensor. The capacitive plate is part of an oscillator circuit where the frequency of the oscillator circuit is controlled by the capacitance of the capacitive plate. As the metalized regions move opposite the capacitor plate, a variable capacitor is formed so that the amount of capacitance in the circuit changes. With this varying capacitance, the frequency of the oscillator increases and decreases as the metalized regions pass the capacitor plate. A third method of detecting the rate at which a tape with metalized regions is pulled from the cartridge employs an amplitude modulated signal. An oscillator of a few hundred kHz to about 1 MHz is connected into a first electrode. A second electrode spaced from the first electrode is connected to an amplification circuit. The metalized region forms a capacitive link between the first electrode and the second electrode that efficiently transmits the oscillator signal to the amplifier. Therefore as the metalized regions pass the first and second electrodes, the signal received by the amplifier circuit varies in amplitude. The output of the amplifier is rectified, producing a pulsed DC output.

If the metalized region is formed from a ferromagnetic alloy, movement of the ferromagnetic region can be used with a permanent magnet to affect a magnetic field sensor such as a Hall effect sensor, a GMR sensor, or even a simple conductor loop or coil. The permanent magnet is positioned opposite the magnetic field sensor, and the ferromagnetic metalized region acts as a magnetic shield selectively blocking magnetic field lines from the permanent magnet to the magnetic field sensor.

It is a feature of the present invention to provide a tape that is drawn from a cartridge to detect airbag cushion employment rate that is constructed to reliably affect a sensor.

It is a further feature of the present invention to provide methods for detecting the velocity of a tape being pulled from a cartridge by an airbag cushion.

It is another feature of the present invention to provide a tape sensor combination that employs detecting a change in capacitance.

It is a still further feature of the present invention to provide a tape, sensor combination that employs detecting a change in magnetic field strength.

It is another feature of the present invention to remind a tape sensor arrangement that can accommodate variations in sensor performance due to device to device variation and aging effects.

Further features and advantages of the invention will be apparent from the following detailed description when taken in conjunction with the accompanying drawings.

DETAILED DESCRIPTION OF THE INVENTION

Figure 1:
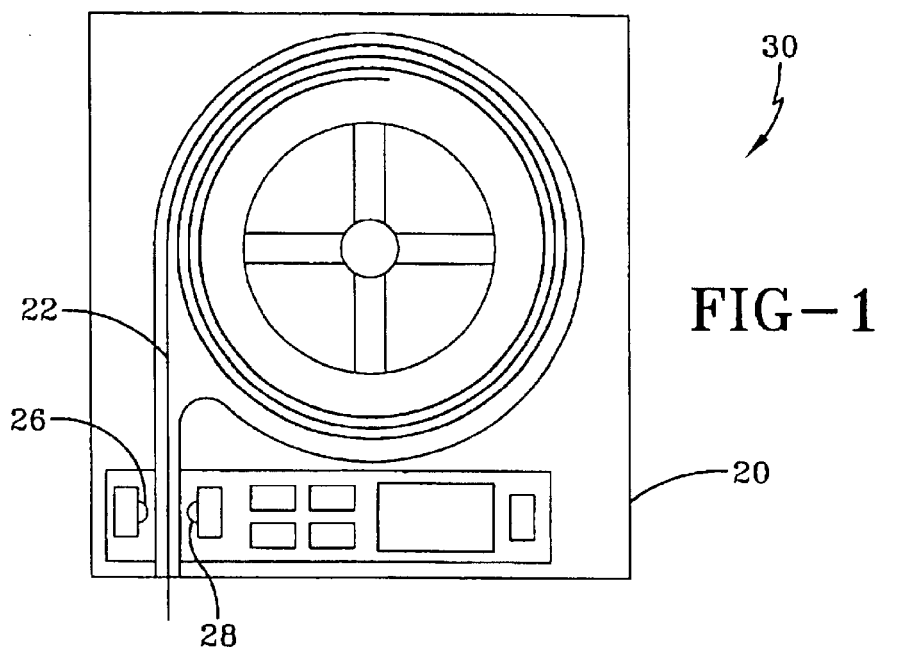
FIG. 1 is a schematic plan view of a tape cartridge employing the infrared sensor arrangement of this invention.
Figure 9:
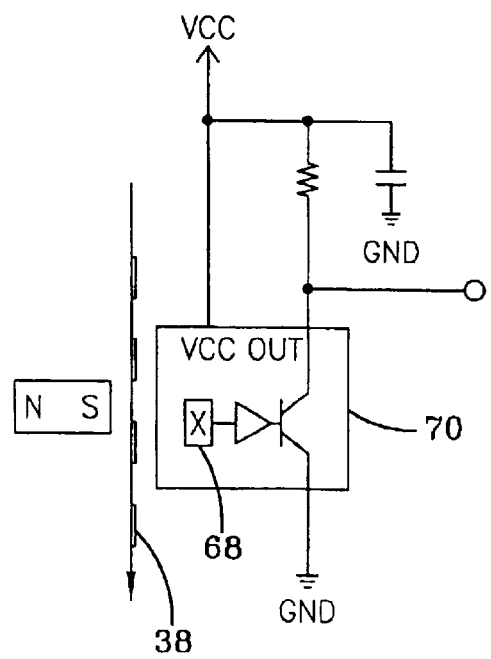
FIG. 9 is an electrical schematic drawing of a circuit used in the tape cartridge of FIG. 8.
Figure 10:
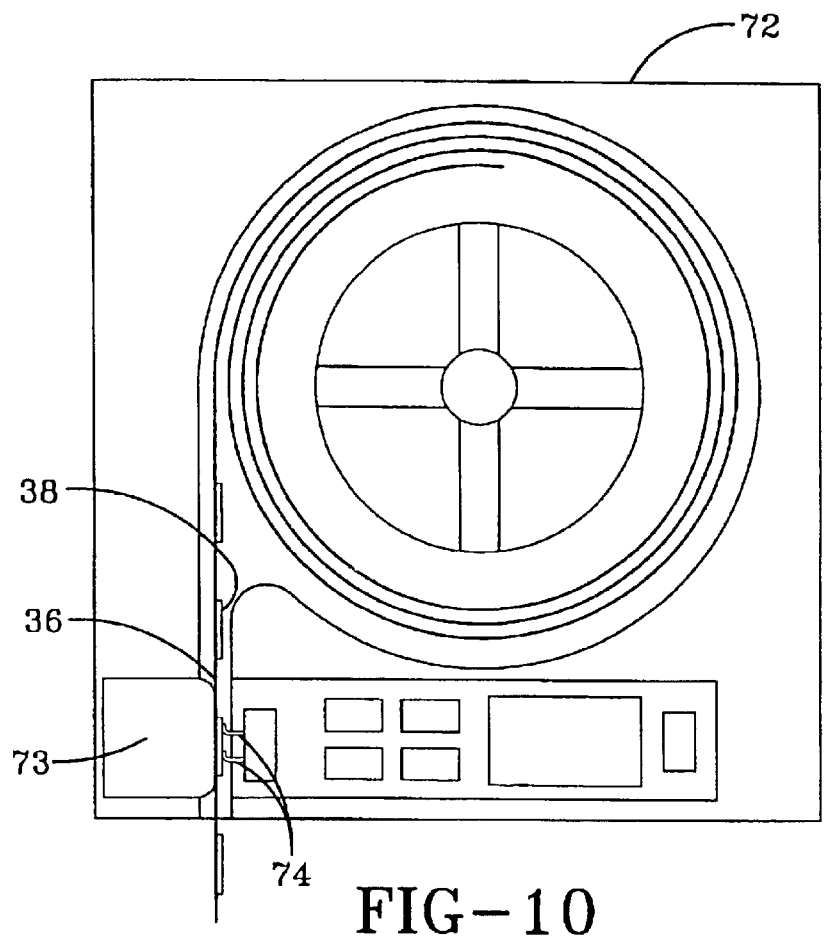
FIG. 10 is a schematic plan view of a yet further tape cartridge of FIG. 1 employing a contact sensor.
Figure 11:
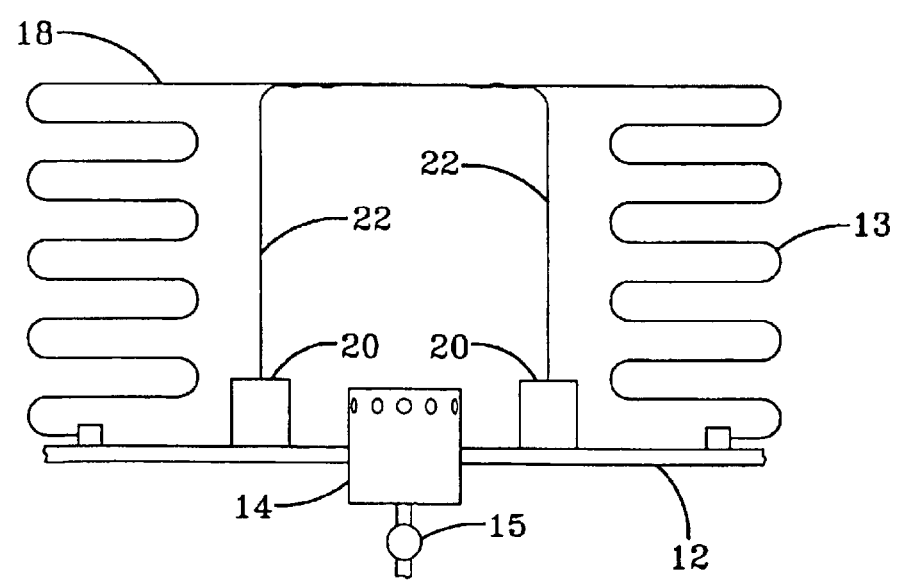
FIG. 11 is a schematic cross sectional view of an airbag module incorporating the tape cartridge of FIG. 1.

Referring more particularly to FIGS. 1–11, wherein like numbers refer to similar parts, an airbag housing 12 with an attached folded airbag cushion 13 is shown in FIG. 11. A gas generator 14 is mounted to the airbag housing which incorporates a valve 15 which can be used to stop the inflation of the airbag cushion 13 by venting gas from the gas generator 14. As shown in FIG. 1, a cartridge 20 containing a length of tape 22 is mounted to the housing 12. As shown in FIG. 11, one end of the tape 22 is attached to the inside surface 18 of the airbag cushion 13 so that when the gas generator 14 is activated and the airbag cushion 13 is deployed, tape 22 is withdrawn from the cartridge 20.

Figure 2:
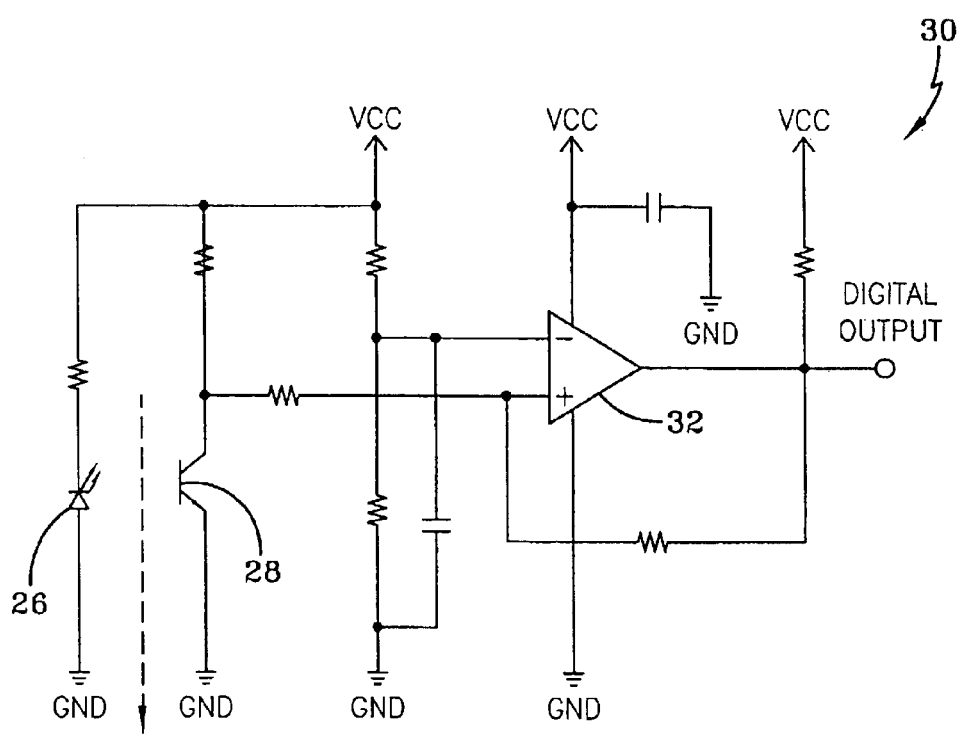
FIG. 2 is an electrical schematic drawing of a circuit used in the tape cartridge of FIG. 1 to provide a clean digital output from the infrared sensor.
Figure 3:
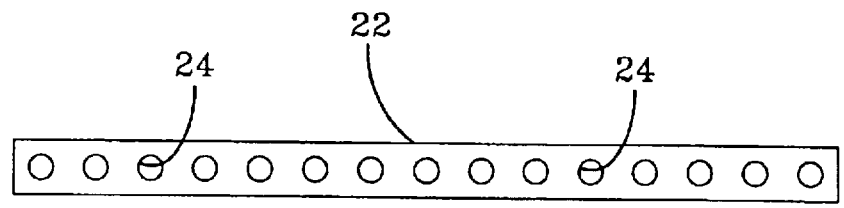
FIG. 3 is a top plan view of a tape for use in the tape cartridge of FIG. 1.

As shown in FIG. 3, the tape 22 is a black polyethylene strip about 5 mm in height and about ¼ mm thick. The tape 22 may alternatively be formed of opaque Mylar® oriented polyester film, or metallic high temperature film. The tape 22 has a series of holes 24 that are 2 mm in diameter and spaced about 5 mm apart. An infrared light emitting diode 26, as shown in FIGS. 1 and 2, is positioned opposite a phototransistor 28. When a hole 24 is positioned between the diode 26 and the phototransistor 28, infrared light passes from the diode to the phototransistor causing it to turn on. The use of a transmission sensor produces a more reliable detection of tape movement which is substantially insensitive to variation in component properties, whether variations between components or variations in a component due to temperature or time.

The use of infrared light is advantageous because the light is less subject to scattering due to dust between the light source and the light detector. However, other wavelengths of light could be used. As shown in FIG. 2, a comparator circuit 30 based on operational amplifier 32 is designed with hysteresis so that a clean digital pulse is produced for each hole 24 that passes between the diode 26 and the phototransistor 28. The comparator circuit 30 with hysteresis eliminates multiple pulses due to noise during the switch transition. Filtering and wave shaping circuitry may be added to further tailor the signal. The resulting output 34 is a digital waveform with a frequency proportional to the tape speed and the pulse width inversely proportional to tape speed. Although shown as discrete components, the circuit 30 could be on a single chip.

Figure 4:
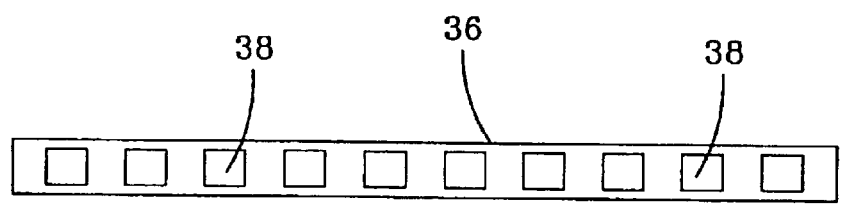
FIG. 4 is a top plan view of an alternative tape for use within the tape cartridge of this invention.

Another tape 36 is shown in FIG. 4. The tape 36 is formed of transparent material such as Mylar® oriented polyester film to which has been applied rectangular areas 38 of opaque paint or a layer of metallization. Metallization provides a tape 36 that has first portions which are electrically conductive and second portions which are not electrically conductive serially positioned along the tape. The Mylar® film may have dimensions similar to that of the black polyethylene tape 22 shown in FIG. 3, with the rectangular areas 38 being about 5 mm square and spaced about 5 mm apart. The tape 36 may also be used in the cartridge 20 where the transparent spaces transmit light and the rectangular areas block the transmission of light.

Figure 5:
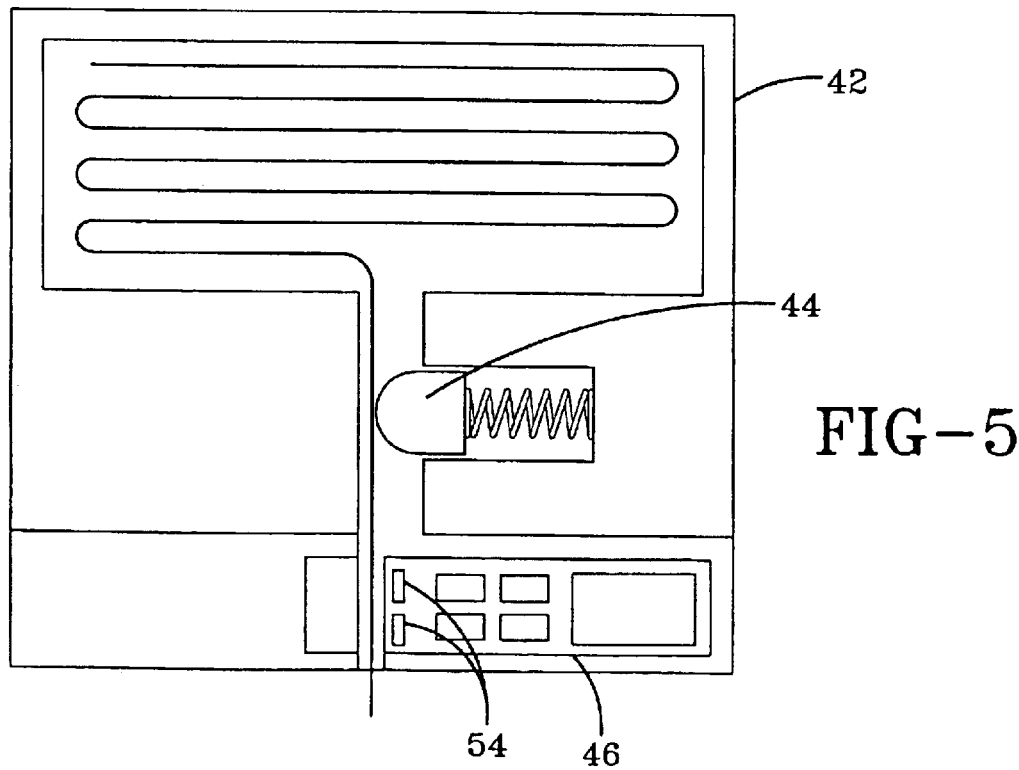
FIG. 5 is a schematic plan view of an alternative tape cartridge of this invention employing a capacitive sensor.
Figure 6:
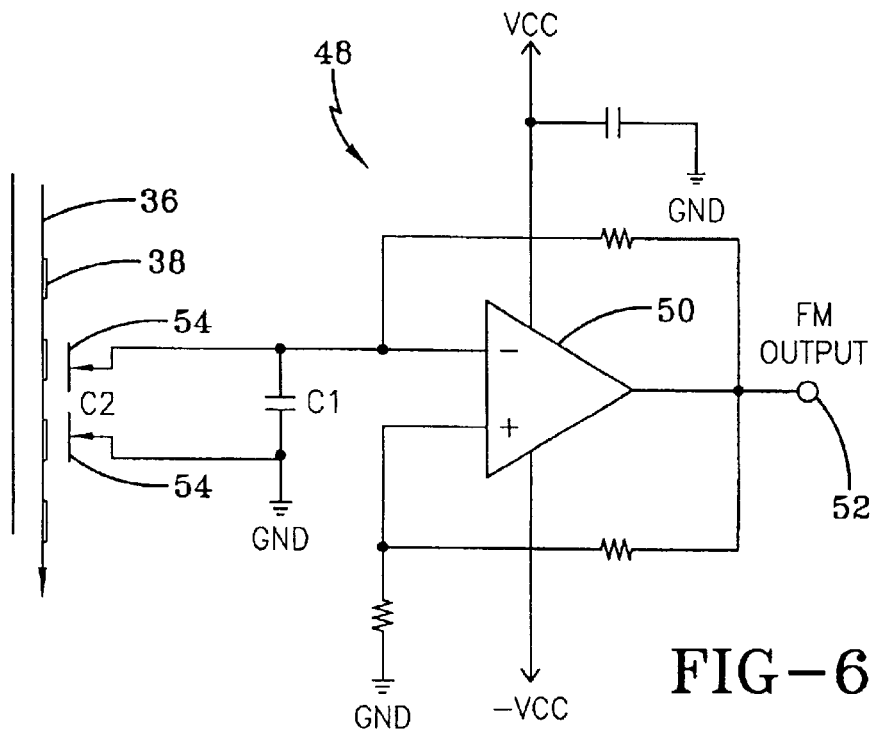
FIG. 6 is an electrical schematic drawing of a circuit used in the tape cartridge of FIG. 5 to provide a frequency modulated output signal proportional to the speed of the tape leaving the tape cartridge.
Figure 7:
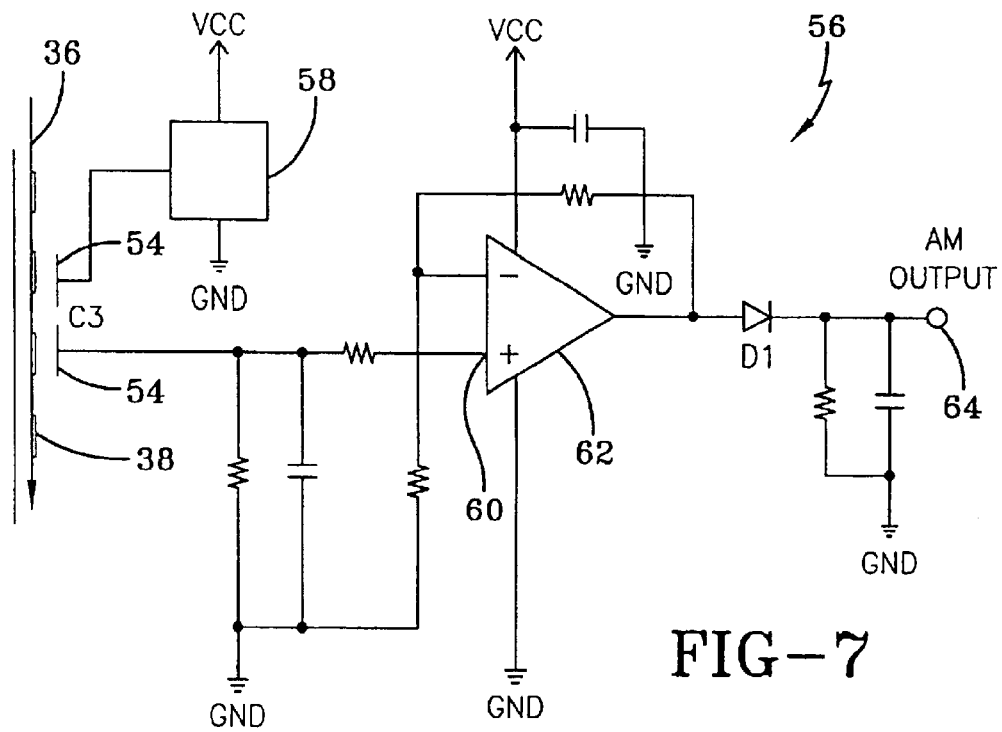
FIG. 7 is another electrical schematic drawing of a circuit used in the tape cartridge of FIG. 5 to provide an amplitude modulated output signal proportional to the speed of the tape leaving the tape cartridge.

An alternative approach of detecting a tape 36 such as the one shown in FIG. 4, in which the rectangular areas 38 are metalized, is illustrated in FIGS. 5, and 6. A tape cartridge 42 employs a fan fold tape storage technique with a spring biased brake 44. The tape cartridge 42 uses a capacitor based sensor 46. The sensor 46 may be used with an oscillator circuit 48, such as the one shown in FIG. 6, to frequency modulate a base frequency as the tape 36 passes the sensor. The oscillator circuit 48 may be a simple relaxation oscillator circuit using an operational amplifier 50 and several discrete components. It should be noted that many types of oscillators may be used, as long as the oscillation frequency can be tuned by using a small capacitive element. A 555 timer circuit would be another implementation which requires no inductor.

In the circuit of FIG. 6, the tape forms a capacitive element C2 that is in parallel with the capacitor C1. This series combination of R3 and C1 and C2 sets the oscillation period which may have a mid frequency of about 300 kHz. R1 and R2 set the threshold switching voltage. If R1=R2 this voltage is ½ VCC. When the circuit is powered up, the operational amplifier 50 rails to either the plus VCC or minus VCC output state. The parallel combination of C1 and C2 is then charged to plus ½ VCC or minus ½ VCC through the resistor R3, at which point the operational amplifier rails in the opposite direction. As the metalized area 38 on the tape increases the value of C2, the base frequency of the oscillator decreases. This increase in capacitance is followed by a decrease in capacitance as the tape 36 moves to where there is no metalized area 38 opposite the two plates 54 and the frequency of the oscillator increases. Thus an FM signal is generated which is dependent upon tape speed. This FM signal may be demodulated to provide an output frequency corresponding to tape speed.

The oscillator circuit 48 is based on an operational amplifier 50 wherein the mid frequency of the oscillator is about 300 kHz. The capacitor C1 controls the frequency of the amplifier output 52. Two metal plates 54 are connected in parallel with the plates of the capacitor C1 so that when a rectangular metalized area 38 is positioned opposite the two metal plates 54 a second capacitor C2 is formed that increases the capacitance of capacitor C1.

Figure 8:
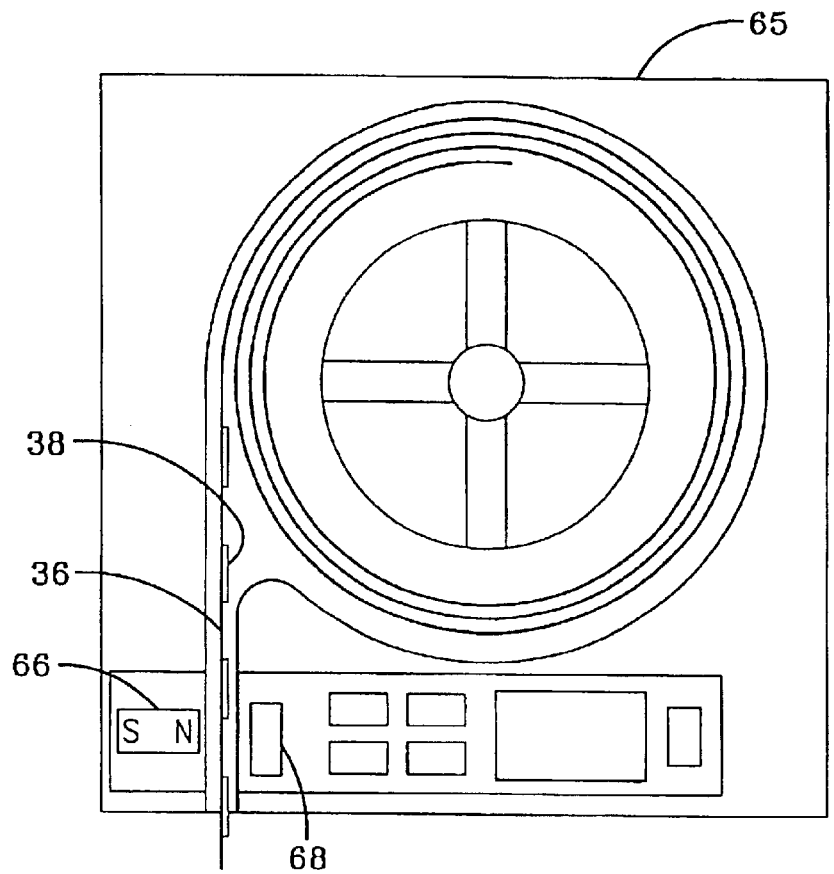
FIG. 8 is a schematic plan view of a tape cartridge of this invention employing a magnetic field sensor.

As shown in FIG. 8, yet another approach to detecting the speed of the tape 36 as it is withdrawn from the cartridge 42 is based on amplitude modulation. An amplitude modulation circuit 56, shown in FIG. 7, has an oscillator circuit 58 that has an oscillation frequency of, for example, 300 kHz to 1 MHz. The signal generated by the oscillator circuit 58 is coupled through a capacitor C3 formed out of two metal plates 54 and a metalized area 38 on the tape 36. Thus the two metal plates 54 and the metalized area 38 of the tape form a capacitive couple between the oscillator 58 and the output 64. When the metalized area 38 completely overlaps the two metal plates 54, the signal is most efficiently transmitted between the oscillator circuit 58 and the positive input 60 of the operational amplifier 62 of the circuit 56. When a metalized area 38 only partially overlaps the metal plates 54 or is completely absent, the transmitted signal decreases or reaches a minimum. Thus the amplitude of the signal received from the oscillator circuit 58 varies with the speed at which the tape is moving past the capacitor C3. The output 64 of the operational amplifier 62 is rectified by diode D1 supplying a pulsed DC output which has frequency which is directly proportional to the speed at which the tape 36 is being withdrawn from the cartridge 42.

Still another approach to detecting the speed of the tape 36 as it is withdrawn from a cartridge 65 is based on the metalized regions 38 being formed of a magnetically impermeable material such as iron, nickel, cobalt, or alloys based on them which have an effective amount of one or more of the ferromagnetic metals. Mu-metal, a nickel-iron alloy (77 percent Ni, 15 percent Fe, plus Cu and Mo), is particularly effective at shielding magnetic fields and also may be used. The metalized regions 38 act as magnetic shunts and prevent the magnetic lines of force from a permanent magnet 66, as shown in FIG. 9, from reaching and affecting a Hall effect sensor 68 which forms part of an integrated circuit which has a unipolar Hall sensor with the open collector output. The integrated Hall device 70 may perform other functions such as temperature compensation, a comparator with hysteresis, and a voltage regulator. The Hall device 70 generates a digital output when the magnetic field to which the Hall effect sensor 68 is exposed exceeds the predetermined switch point.

Another approach to detecting the passage of the tape 36 with metalized regions 38 is illustrated in FIG. 10. The cartridge 72 has two spaced apart electrical contacts 74 that successively engage the tape 36 against a supporting member 73. When a metalized region 38 bridges the electrical contacts 74 a circuit, not shown, provides a voltage or current output which is not present when a metalized region 38 is not connecting the contacts 74. A comparator circuit (not shown) with hysteresis removes any contact bounce and provides a clean and digital output which has a frequency which is proportional to the speed at which the tape 36 is withdrawn from the cartridge 72.

It should be understood that the tape 22 or 36 can be used with various methods of storing the tape within the cartridge, for example: wrapped around the central post, or wrapped around a rotatable spool, or simply formed in a coil or fan fold arrangement. It should be understood that tape 22 or 36 could be a metal tape with holes formed therein. It should be understood that the metallization could be by any technique which forms a conductive film on a base film and could include plating, flame spraying, vacuum depositing, adhesive bonding, or painting the conductive regions on to a tape substrate. The tape substrate is not intended to be limited to a film but could include a woven material or fabric. Moreover, the tape material may be high temperature film, a woven cloth or any other material capable of sustaining inflator temperatures and having the necessary tensile strength It is understood that the invention is not limited to the particular construction and arrangement of parts herein illustrated and described, but embraces all such modified forms thereof as come within the scope of the following claims.

We claim:

1. An airbag deployment monitor comprising:
   a cartridge containing a length of tape, the tape having a first end attached to an inside surface of an airbag cushion, wherein the tape has first portions which conduct electricity, and second portions which are substantially non-conductive, and wherein the first portions alternate with second portions;

a sensor assembled with the cartridge so that as the tape is drawn from the cartridge a first portion is positioned opposite the sensor, followed by a second portion, provides an output which varies depending on whether the first portion, or the second portion is positioned opposite the sensor, so that the sensor output varies with time as tape is withdrawn from the cartridge.

2. The airbag deployment monitor of claim 1 wherein the tape comprises an oriented polyester film.

3. A method for detecting the rate at which an airbag cushion is deploying comprising the steps of:

inflating an airbag cushion;

drawing a tape by a first end connected to the airbag cushion from a tape cartridge wherein the tape has first portions which conduct electricity, and second portions which are substantially non-conductive, and wherein the first portions alternate with second portions; and monitoring the rate at which the tape is withdrawn from the cartridge by detecting the passage of the first portions of the tape past a sensor assembled with the cartridge, the sensor comprising two spaced apart contacts positioned to contact the tape as tape is withdrawn from the cartridge, the two spaced apart contacts being positioned to form a current path with portions of the tape that conduct electricity when a first portion is opposite the two contacts.

* * * * *